(12) United States Patent
Schwartz et al.

(10) Patent No.: US 9,408,073 B2
(45) Date of Patent: Aug. 2, 2016

(54) PROXIMITY AND BEHAVIOR-BASED ENTERPRISE SECURITY USING A MOBILE DEVICE

(71) Applicant: Oracle International Corporation, Redwood Shores, CA (US)

(72) Inventors: Daniel Schwartz, San Francisco, CA (US); Arin Bhowmick, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 72 days.

(21) Appl. No.: 14/024,536

(22) Filed: Sep. 11, 2013

(65) Prior Publication Data
US 2015/0074763 A1     Mar. 12, 2015

(51) Int. Cl.
H04W 12/06 (2009.01)
H04L 29/06 (2006.01)
H04W 4/02 (2009.01)

(52) U.S. Cl.
CPC .......... *H04W 12/06* (2013.01); *H04L 63/0853* (2013.01); *H04L 63/105* (2013.01); *H04L 63/108* (2013.01); *H04L 63/20* (2013.01); *H04W 4/02* (2013.01)

(58) Field of Classification Search
None
See application file for complete search history.

(56) References Cited

U.S. PATENT DOCUMENTS

| | | | |
|---|---|---|---|
| 2001/0044312 A1* | 11/2001 | Yamane | 455/456 |
| 2002/0083025 A1* | 6/2002 | Robarts et al. | 706/12 |
| 2006/0010206 A1* | 1/2006 | Apacible et al. | 709/205 |
| 2006/0129829 A1* | 6/2006 | Aaron et al. | 713/182 |
| 2007/0077920 A1* | 4/2007 | Weeks et al. | 455/414.1 |
| 2007/0094711 A1* | 4/2007 | Corley et al. | 726/3 |
| 2010/0035589 A1* | 2/2010 | Wormald et al. | 455/414.1 |
| 2010/0319052 A1* | 12/2010 | Ferren et al. | 726/3 |

* cited by examiner

*Primary Examiner* — David Le
(74) *Attorney, Agent, or Firm* — Trellis IP Law Group, PC (57) ABSTRACT

A system and method for facilitating configuring software security functionality. An example method includes employing a first computing device to collect information associated with a user of enterprise software, resulting in collected information; and dynamically adjusting one or more security features of enterprise software running on or accessible via a second device based on the collected information. The software running on the second device may include or represent the enterprise software that includes software security functionality. The collected information may include contextual information. An administrator user option facilitates adjusting the one or more rules.

20 Claims, 4 Drawing Sheets

FIG. 4

PROXIMITY AND BEHAVIOR-BASED ENTERPRISE SECURITY USING A MOBILE DEVICE

BACKGROUND

The present application relates to software security and more specifically to systems and methods for adjusting and configuring security system behaviors, such as by adjusting enterprise software access and permissions.

Systems for facilitating configuring and adjusting software security features are employed in various demanding applications, including user account login and authentication functionality for websites, systems for controlling user access permissions to enterprise databases, and so on. Such applications often demand configurable security systems that may be readily adjusted in accordance with the needs of a given computing environment.

Conventionally, software security mechanisms are often relatively static. For example, once a user has established an account or has otherwise been granted certain permissions to access and use computing resources, those permissions and account access capabilities seldom change unless a user changes job roles, closes an account, signs up for new services, and so on.

However, the relatively static nature of the security systems and tedious methods for reconfiguring security system behaviors (e.g., methods involving opening new accounts, applying for new access privileges, and so on), may not account for potentially rapidly changing security needs of a given computing environment.

Accordingly, in some instances, where less security or more security would be appropriate, a static level of security is provided. In certain cases, this may reduce user productivity, such as by requiring a user to repeatedly log in to software if the user has not interacted with the software for a predetermined time interval.

SUMMARY

An example method for facilitating configuring software security functionality includes employing a first computing device to collect information associated with a user of enterprise software, resulting in collected information, and providing a signal in response thereto; and dynamically adjusting one or more security features of software running on a second device based on the signal. The software running on the second device may include or represent the enterprise software.

In a more specific embodiment, the method includes employing a mobile device to collect contextual information associated with a user of enterprise software, resulting in collected contextual information; using the contextual information with reference to a set of rules for mapping contextual information to security software behaviors, and determining one or more adjustments to be made to the security software behaviors in response thereto; and adjusting one or more user access permissions to one or more security features of enterprise software, such as Customer Relationship Management (CRM), Financials, Human Capital Management/Resources, Supply Chain Management, Procurement, and other Enterprise Resource Planning (ERP) applications, being accessed by a desktop computer and/or mobile device associated with the user in accordance with the one or more adjustments.

The collected information may include contextual information, and an administrator user option enables customization of the one or more rules. The one or more rules may include computer code for accessing user calendar information to determine when the user is in a meeting, and selectively restricting software access in response thereto.

The one or more rules may further include computer code for determining that a user is commuting, and selectively restricting software access in response thereto; for enabling determining that a user is in an office that includes the second computing device, and selectively enabling software access in response thereto; and for determining that a user is within an office building but not accessing the second computing device, and then selectively partially limiting software access in response thereto.

The software accessible via the second device may include enterprise software running on one or more servers. The contextual information included among the collected information may further include location information pertaining to a location of the mobile device, and velocity information pertaining to a velocity of the mobile device. The example method may further include employing the velocity information to facilitate determining when a user is commuting and then restricting user access to one or more features the enterprise software in response thereto.

The collected information may further include user location information, which may be employed to selectively adjust the security features to enable a user to access all software features for which the user has permission to access when the user location is within a predetermined range of the desktop computer.

The collected information may further include software usage history information pertaining to how the user has previously used software included in the enterprise computing environment. For example, the collected information may further include information pertaining to a task that a user is actively working on in addition to timing information pertaining to how much time has passed since a user has interacted with software whose access is subject to the one or more security features. If a user does not use a specific application or work on a particular software task for a given time interval during a certain time of day, access to that application or associated software task functionality may be restricted for safety purposes, unless the user explicitly logs into the application or functionality.

Hence, certain embodiments discussed herein employ contextual information (e.g., user location information, behavior history, schedule, calendar entries, past activities, current task, time away from computer, etc.), provided at least in part via a mobile device, to dynamically adjust security features of enterprise software running on or otherwise accessed via the mobile device and/or a desktop computer.

Certain embodiments may provide an additional layer of security that may enhance preexisting software security features and enable selective adjustments to security features to account for changing circumstances and associated security needs. Exact ways security features are adjusted based on the contextual information may be specified via configurable rules, which may be customized to meet the needs of a given implementation.

Accordingly, certain embodiments discussed herein may enhance situational awareness of security software functionality, thereby enabling the security software functionality to make more informed decisions with reference to predetermined customizable rules.

A further understanding of the nature and the advantages of particular embodiments disclosed herein may be realized by reference of the remaining portions of the specification and the attached drawings.

DETAILED DESCRIPTION OF EMBODIMENTS

For the purposes of the present discussion, an enterprise may be any organization of persons, such as a business, university, government, military, and so on. The terms "organization" and "enterprise" are employed interchangeably herein. Personnel of an organization, i.e., enterprise personnel, may include any persons associated with the organization, such as employees, contractors, board members, customer contacts, and so on.

An enterprise computing environment may be any computing environment used for an enterprise. A computing environment may be may be any collection of computing resources used to perform one or more tasks involving computer processing. An example enterprise computing environment includes various computing resources distributed across a network and may further include private and shared content on Intranet Web servers, databases, files on local hard discs or file servers, email systems, document management systems, portals, and so on.

Enterprise software, such as Enterprise Resource Planning (ERP) software, may be any set of computer code that is used by an enterprise or organization. Examples of enterprise software classifications include HCM (Human Capital Management) software, CRM (Customer Relationship Management) software; BI (Business Intelligence) software, and so on. Additional examples of enterprise software include Financials, Assets, Procurement, Projects, Supply Chain, and so on. The terms "enterprise software," "enterprise software application," and "enterprise application" may be employed interchangeably herein.

For clarity, certain well-known components, such as hard drives, processors, operating systems, power supplies, routers, Internet Service Providers (ISPs), and so on, have been omitted from the figures. However, those skilled in the art with access to the present teachings will know which components to implement and how to implement them to meet the needs of a given implementation.

Figure 1:
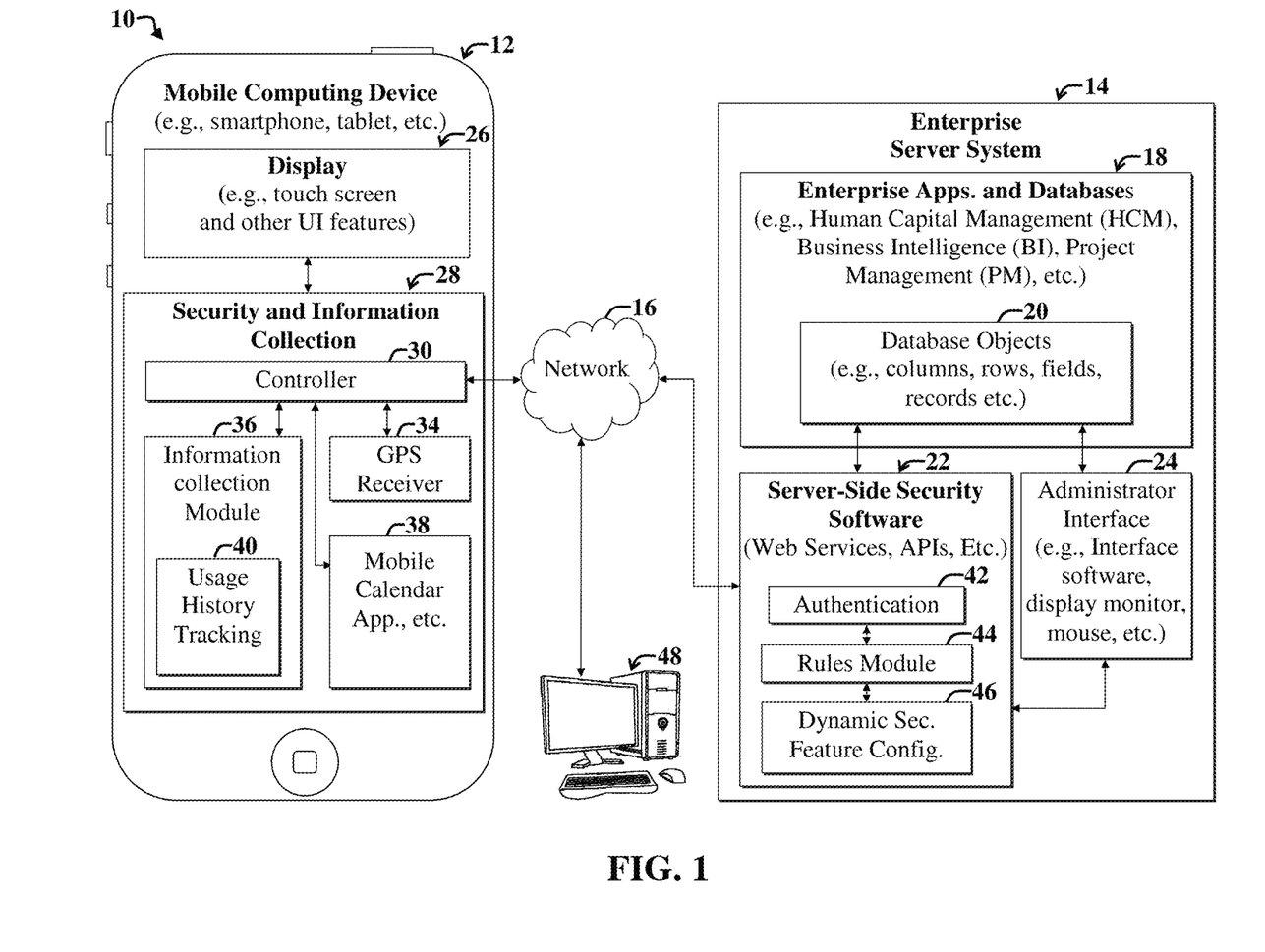
FIG. 1 illustrates an example enterprise computing environment and accompanying system for facilitating dynamic configuration of an enterprise software security mechanism based on situational awareness information provided thereto via a mobile device.

FIG. 1 illustrates an example enterprise computing environment 10 and accompanying system for facilitating dynamic configuration of an enterprise software security mechanism 22 based on situational awareness information, i.e., contextual information, provided thereto via a mobile device 12.

The enterprise computing environment 10 includes a first mobile device 12, e.g., a smartphone 12 (or tablet, laptop, etc.) and a desktop computer 48 in communication with an enterprise server system 14 via a network 16, such as the Internet. The computing devices 12, 48 may represent client devices of the enterprise server system 14. Note that, depending upon the implementation, the enterprise server system 14 may include one or more servers or networked server clusters.

For the purposes of the present discussion, a server may be any computing resource, such as a computer and/or software that is adapted to provide content, e.g., data and/or functionality, to another computing resource or entity that requests it, i.e., the client. A client may be any computer or system that is adapted to receive content from another computer or system, called a server. A server system may be any collection of one or more servers and accompanying computing resources.

A mobile computing device may be any computer that is adapted for portable use. In general, a computing device may be any computer. A computer may be any processor coupled to memory. Examples of mobile computing devices include laptops, notebook computers, smartphones and tablets (e.g., iPhone®, iPad®, Galaxy Tab®, Windows Mobile® smartphones, Windows 7® smartphones and tablets, Android® smartphones tablets, Blackberry® smartphones, and so on), and so on.

Various specific example embodiments discussed herein employ a mobile computing device further equipped with various features, such as a camera, a network connection, Global Positioning System (GPS) receiver, gyroscope, compass, and user input functionality, such as a touch screen and/or or qwerty keypad. The terms "mobile device" and "mobile computing device" are employed interchangeably herein.

The example mobile computing device 12 includes security and information collection software 28, which includes a controller 30 in communication with a Global Positioning System (GPS) receiver 34, a mobile calendar application 38, and an information collection module 36. The information collection module 36 includes a history tracking module 40, which is adapted to store software usage history and general device usage history information.

For the purposes of the present discussion, usage history information may include any data pertaining to what software functionality and/or data a user has accessed and at what time or times the user has accessed the functionality and/or data. The usage history information may also include additional metadata (e.g., not merely timing information) such as GPS location and/or velocity information associated with a particular usage of software and associated software functionality.

Software functionality may be any function, capability, or feature, e.g., stored or arranged data, that is provided via computer code, i.e., software. Generally, software functionality may be accessible via use of a user interface and accompanying user interface controls and features. Software functionality may include actions, such as retrieving data pertaining to a business object; performing an enterprise-related task, such as promoting, hiring, and firing enterprise personnel, placing orders, calculating analytics, launching certain dialog boxes, performing searches, and so on.

The controller 30 includes computer code for interfacing the security and information collection module 28 with the enterprise server system 14 and accompanying software and for coordinating input and output to and from the various modules 34-40 of the security and information collection software 28.

The enterprise server system 14 includes various enterprise software applications 18, such as databases, which may store database objects 20. The enterprise software applications 18 and associated functionality and database objects may be accessible to the client devices 12, 48 via server-side security software 22.

The server-side security software 22 includes various Application Programming Interfaces (APIs), web services, and so on, to facilitate client device access to the enterprise software applications 18 and accompanying database objects 20. The server-side security software 22 further includes an authentication module 42 in communication with a rules module 44 and a dynamic security feature configuration module 46.

An administrator user interface 24 includes software and hardware functionality adapted to enable an administrator to configure or otherwise adjust features of the enterprise software 18 and the server-side security software 22, such as by making adjustments to the dynamic security feature configuration module and rules employed by the rules module 44

The desktop computer 48 may include client-side enterprise software and may further include a browser for facilitating accessing server-side software functionality provided via the enterprise server system 14 via the server-side security software 22.

In operation, the information collection module 36 is adapted to communicate with other software (e.g., mobile enterprise software) and functionality running on the mobile device 12, including the GPS receiver 34, and example mobile calendar application 38, to collect contextual information, including usage history information.

For the purposes of the present discussion, contextual information may be any data or information that characterizes a current state of a computing environment and/or behavior of a user of enterprise computing resources, such as hardware and software. For example, the current state of a computing environment may be affected by a user commuting to work with a cell phone, which is considered part of the enterprise computing environment and which is used to interface therewith.

Examples of contextual information include not only user behavior history, but user schedule and itinerary (e.g., as provided via the mobile calendar application 38), past user activities, including software activities and calendar events (e.g., appointments and meetings); information indicating a current task that a user is working on or assigned to and/or a software application that the user is currently employing; information indicating how much time a user of the mobile device 12 has spent away from the user's desktop computer 48 (i.e., how much time has passed since a user has interacted with software whose access is subject to the one or more security features), and so on.

For the purposes of the present discussion, a location of a mobile device is considered to represent a location of a user of the mobile device 12. In certain cases, the fact that a user is currently carrying their mobile device 12 can be confirmed, such as by issuing a prompt to the user, e.g., a prompt for a password, which may be displayed on the mobile device 12. When the user responds to the prompt, this may facilitate confirming that the location of the user coincides with the location of the mobile device 12. Also note that user location can be confirmed by the location of the mobile device in combination with knowledge of what the user is doing in the system, e.g., whether the user is actively employing software and/or otherwise interacting with the device 12; whether the mobile device 12 is in proximity to user's desktop device 48, and so on. Accordingly, in certain implementations, issuance of a prompt to confirm that the user is in proximity to their mobile device 12 may be unnecessary.

In general, the contextual information discussed herein may include information associated with a user of the mobile device 12 and desktop computer 48 and information associated with the mobile device 12 and desktop computer 48, including software (e.g., the enterprise software applications 18) accessible to the client devices 12, 48.

For the purposes of the present discussion, information associated with a user (also called information pertaining to a user) may be any data characterizing a user, including previous user behaviors. For example, the information associated with a user may include contextual information, such as location information, GPS velocity information of a phone carried by the user, calendar entries made by a user into calendar software, software usage history, such as times at which a user has historically used a computer and/or accompanying software, and so on.

Furthermore, information associated with a user may include additional information associated with software and devices employed by a user, including computing resources, such as software, connectivity status, display screen resolution of a user's mobile device, and so on. Furthermore, the contextual information associated with a user may include information about a task that a user is working on or has been assigned to; software access permissions, job role, team, social network status, user performance ratings, and so on.

A user may employ mobile device 12 and/or desktop computer 48 to log into the server system 14, such as by providing log-in username and password (and/or via other authentication mechanisms) to the authentication module 42. The authentication module 42 includes computer code for then matching the supplied log-information with software access permissions associated with the user and with any dynamic security rules maintained by the rules module 44.

The contextual information derived via the information collection module 36 represents collected information. The collected information may be selectively forwarded to the server-side security software 22 for use by the dynamic security feature configuration module 46 with reference to security rules maintained via the rules module 44.

The rules module 44 maintains security rules specifying how contextual information supplied via the client-side security and information collection software 28 should be used to adjust user permissions to access software and functionality and data provided via the enterprise applications 18.

The dynamic security feature configuration module 46 adjusts user access permissions and other software security features based on the collected information received from the client-side security and information collection software 28 in accordance with rules of the rules module 44. Note that initial security levels/permissions may include defaults specified by computer code and user permissions initially specified via the authentication module 42.

Note that the authentication module 42 may represent security functionality that might otherwise preexist before enterprise security software functionality is augmented via the rules module 44, dynamic security feature configuration module 46, and client-side security and information collection software 28.

For the purposes of the present discussion, a security feature may be any mechanism or capability that is adapted to selectively limit access to software functionality. A dynamic adjustment to a security feature may be any automatic software-implemented adjustment to a security feature, such as an adjustment to a user access permission made by the dynamic security feature configuration module 46.

After enterprise software security features are adjusted via the server-side security software 22 in response to collected information provided via the mobile device 12 and with reference to security rules maintained by the rules module 44, then such security features are also applicable to the user's desktop computer 48, which is used to access the server-side enterprise applications 18 and associated data and functionality.

The various security modules 28, 22 facilitate implementing a method that includes using the mobile device 12 to provide contextual input (e.g., user location information, behavior history, schedule, calendar entries, past activities, current task, time away from computer, etc.) to a security system 22, which uses the input to adjust security system behaviors and features in accordance with rules maintained by the rules module 44.

Those skilled in the art with access to the present teachings may readily develop software to implement functionality discussed herein to meet the needs of a given implementation, without undue experimentation.

Figure 2:
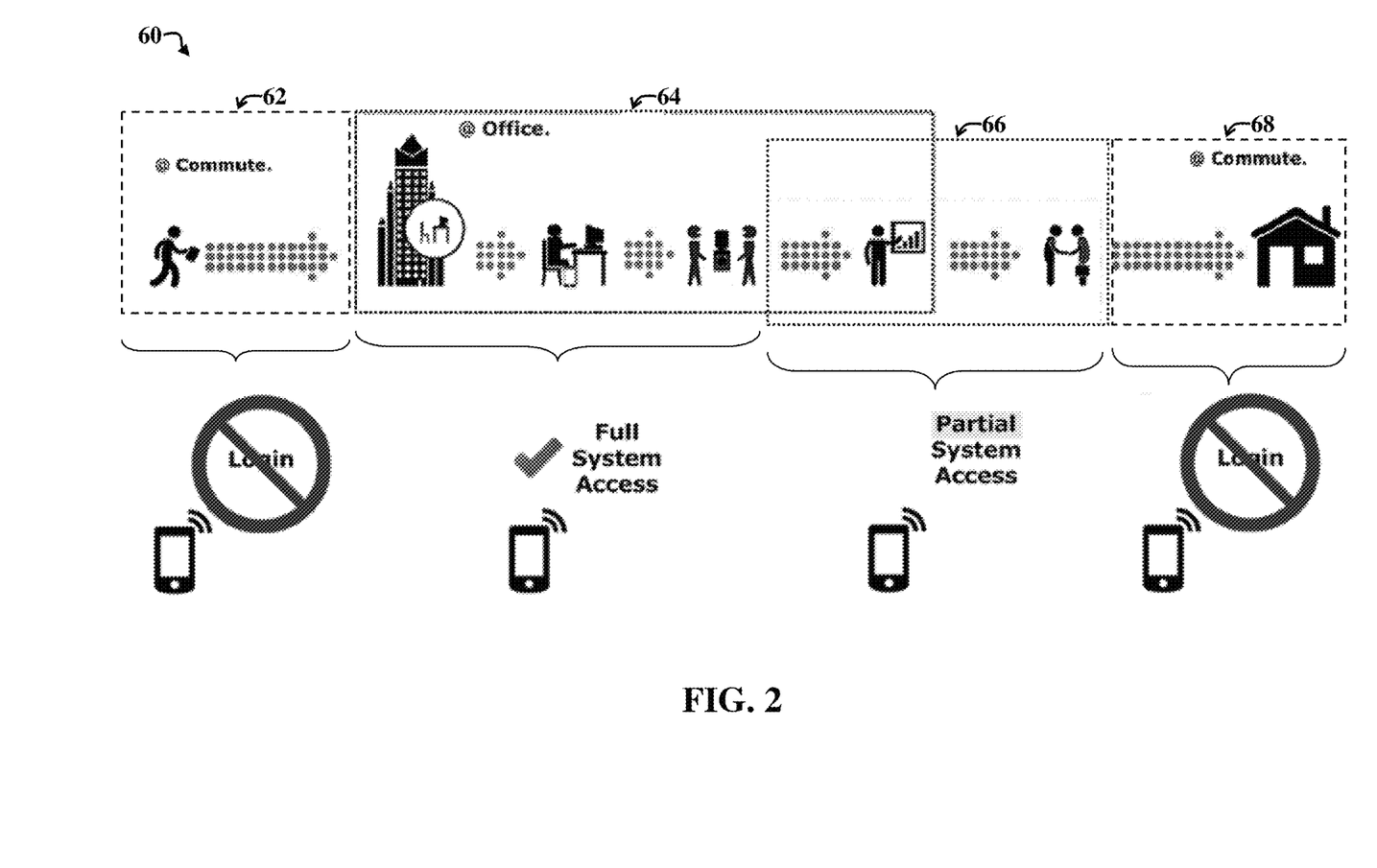
FIG. 2 is a diagram illustrating an example method in combination with an example use case of the system of FIG. 1.

FIG. 2 is a diagram illustrating an example method in combination with an example use case 60 of the system 10 of FIG. 1. FIG. 2 further illustrates examples of how enterprise software security permissions change based on factors, such as location, software usage, and other activities. In the present example embodiment, the user is initially commuting, as illustrated in a commute phase block 62.

With reference to FIGS. 1 and 2, when the user is commuting, the GPS receiver 34 will provide velocity information (or other position-change information) to the information collection module 36. The controller 30 may include computer code for determining, based on the velocity information and associated position information (e.g., with reference to a known user commute path) that the user is commuting to work. An associated signal is then forwarded from the mobile device 12 to the server-side security software 22, which supplies the signal to the dynamic security feature configuration module 46.

With knowledge that the user is commuting, the dynamic security feature configuration module 46 references the rules module 44. Rules maintained by the rules module 44 may specify that when a user is commuting, enterprise software access should be restricted.

Accordingly, during the commute phase 62, access to the enterprise software 18 and accompanying data objects 20 is restricted by the dynamic security feature configuration module 46, e.g., set to no-access. During the commute phase 62, any persons attempting to access the enterprise software 18 via the user's computer 48 will not be able to access the enterprise software 18, even if the user has already logged into and is currently logged into the enterprise server system 14.

Next, during an office phase 64, the collected contextual information provided by the mobile device 12 to the server-side security software 22 indicates that the user has entered the user's office. In the present example embodiment, the office location corresponds to the location of the desktop computer 48 of FIG. 1. The fact that a user has entered their office can be further corroborated or verified by the system 10 of FIG. 1 by comparing the current time with historical times (or an average thereof) at which the user has previously entered their office, e.g., as indicated by historical mobile device location and time information maintained via the history tracking module 40 of FIG. 1. If the current time is within a predetermined time interval of average office-entry times, then this may further confirm that the user has entered their office. If such confirmation fails, additional and/or different mechanisms may be employed to further confirm that the user has entered their office. For example, the user may be prompted to enter a password and respond to a location-confirmation prompt for added confirmation.

In the present example embodiment, the rules maintained by the rules module 44 may specify that when the user is in the office and logged into the server system 14, then full access to the enterprise software 18 should be granted on both the mobile device 12 and the desktop computer 48. Accordingly, the dynamic security feature configuration module 46 grants full user access to the enterprise software 18 and associated data and functionality.

Subsequently, during an office-exiting phase 66, such as when the user is meeting with clients, as indicated by contextual information provided from the mobile device 12 to the server-side security software 22, partial system access is granted based on the rules maintained by the rules module 44.

Exact details as to what constitutes partial access, restricted access, and limited access may be implementation specific and may vary, without departing from the scope of the present teachings. Furthermore, note that various security system behaviors discussed herein are illustrative and may be adjusted or customized, such as via the administrator interface 24 of FIG. 1.

Subsequently, during a final commute phase 68 from work, access to the enterprise server system 14 and accompanying applications 18 is restricted in a similar manner as during the initial commute phase 62 to work.

Note that during the first commute phase 62, an enterprise may not want users accessing the network (i.e., server system 14) for security reasons (e.g., cell phone data reading, WiFi spying, etc.), as reflected in the security rules maintained by the rules module 44 of FIG. 1.

Note that phases, such as additional sub-phases, other than the example phases 62-68 shown are possible. For example, the security system (e.g., represented by the client-side security and information collection software 28 and the server-side security software 22 of FIG. 1) may detect that the user is in a meeting based on the user's location via mobile device 12 and associated calendar (e.g., as maintained via the mobile calendar application 38, online schedule, and/or other accessible calendar software). The security system can then reduce access. For example, in such cases, an enterprise may determine that no access to benefits or expenses are needed, since the user is in a sales meeting and will not need access to internal Human Resources (HR) applications, since the user's focus should be elsewhere.

During the office phase 64, the security system (e.g., including components 28, 22 of FIG. 1) may detect that the mobile device 12, associated user, and desktop computer 48 are relatively close together (e.g., in the same office building, but the user is away from the desk, i.e., away from the exact location of the desktop computer 48). In this case, the security system may learn, for example, that the user (around a certain time) takes a short water cooler break before returning directly to work, and therefore designates this time period as a safe time period to not restrict access (since the user will likely return to the desktop computer 48 shortly).

As another example, during the office phase 64, the security system may detect that the user and accompanying mobile device 12 is in a "break room" or other room and adjust system behaviors and access permissions accordingly. Information, e.g., GPS coordinates, specifying the location of such a break room and information indicating associated system behaviors can be predetermined and encoded in rules maintained via the rules module 44 of FIG. 1. Accordingly, a map of an office environment indicating locations of offices, meeting rooms, break rooms, and so on, may be employed to implement various location-sensitive rules for governing or otherwise affecting system security functionality based on mobile device and associated user location information.

In summary, functionality of the security system (e.g., as represented via the modules 28 and 22 of FIG. 1) and accompanying features may be adjusted in accordance with various factors, such as user location, schedule, past behavior, current task, and time away from computer, e.g., as determined with reference to information collected via the information collection module 36 of FIG. 1.

In general, the user employs the mobile device 12 and/or desktop computer 48 to access enterprise applications 18 and has different access privileges based on rules (e.g., maintained by the rules module 44) established by the associated enterprise, e.g., via the administrator user interface 24 of FIG. 1. The server-side security software 22, 28 adapts and reacts to user behavior based on those rules and contextual information received from the mobile device 12.

Note that enterprises employing embodiments discussed herein may customize security protocols and rules (e.g., as maintained by the rules module 44) as per requirements. Use of the mobile device 12 to adjust security system features and functionality may empower intelligent or situationally aware protection.

Note that while the present example embodiment is discussed with respect to enterprise software, including security software running on an enterprise server system, embodiments are not limited thereto. For example, in certain implementations, security software and associated software protected thereby may run on the desktop computer 48. In such implementations, the mobile computing device 12 of FIG. 1 may communicate with the security software via WiFi and/or via other mechanisms, such as Bluetooth and/or remote access technologies, to implement versions of embodiments discussed herein.

Figure 3:
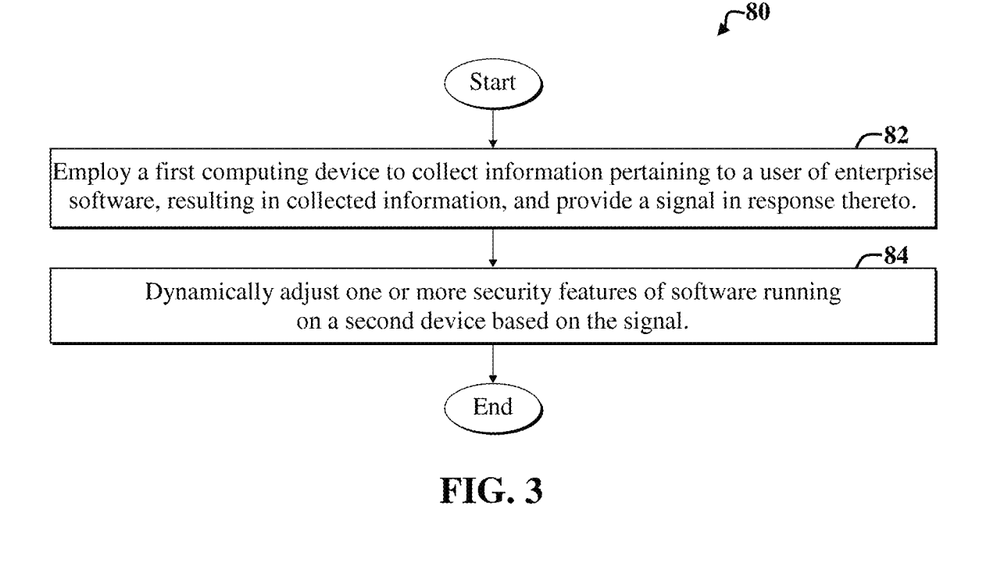
FIG. 3 is a flow diagram of a first example method adapted for use with the embodiments of FIGS. 1-2.

FIG. 3 is a flow diagram of a first example method 80 adapted for use with the embodiments of FIGS. 1-2. The example method 80 includes a first step 82, which involves employing a first computing device to collect information pertaining to a user of enterprise software, resulting in collected information, and providing a signal in response thereto.

A second step 84 includes dynamically adjusting one or more security features of software running on a second device based on the signal. For example security features may be selectively adjusted to enable a user to access all software features for which the user has permission to access when the user location is within a predetermined range of the desktop computer.

Figure 4:
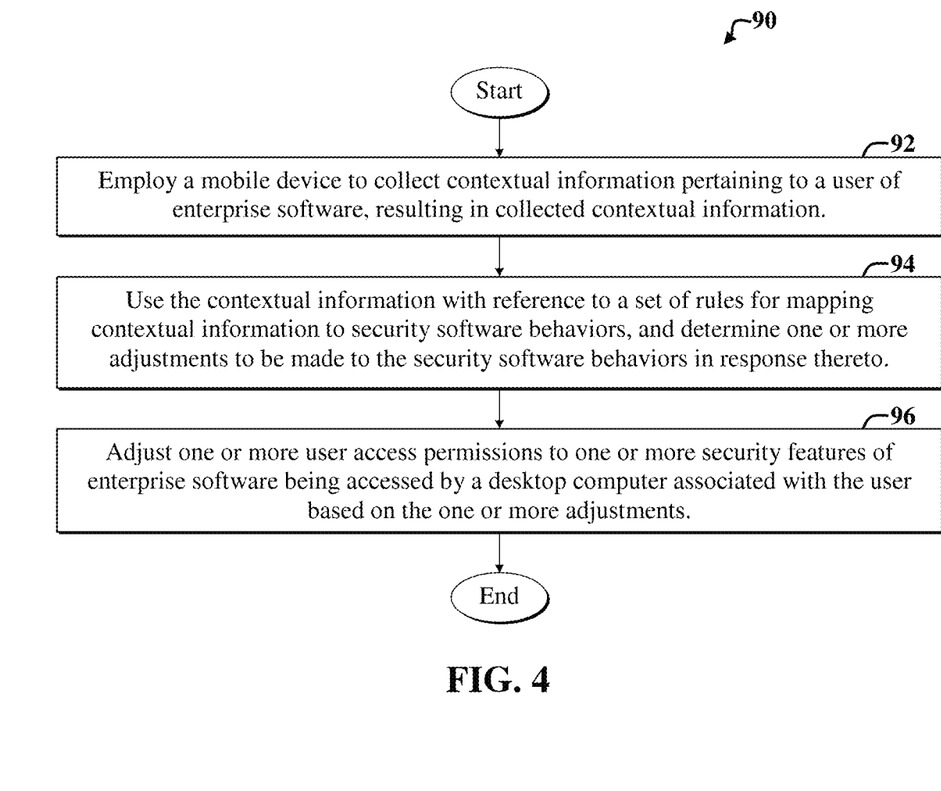
FIG. 4 is a flow diagram of a second example method adapted for use with the embodiments of FIGS. 1-3.

FIG. 4 is a flow diagram of a second example method 90 adapted for use with the embodiments of FIGS. 1-4. The second example method 90 represents a method for facilitating configuring software security functionality.

The second example method 90 and includes a first information-gathering step 92, which involves employing a mobile device to collect contextual information pertaining to a user of enterprise software, resulting in collected contextual information.

A second rules-referencing step 94 includes using the contextual information with reference to a set of rules for mapping contextual information to security software behaviors, and determining one or more adjustments to be made to the security software behaviors in response thereto.

A third permissions-adjusting step 96 includes adjusting one or more user access permissions to one or more security features of enterprise software being accessed by a desktop computer associated with the user, based on the one or more adjustments.

Although the description has been described with respect to particular embodiments thereof, these particular embodiments are merely illustrative, and not restrictive.

For example, while various embodiments discussed herein are adapted for use in enterprise computing environments, embodiments are not limited thereto. For example, any computing environment involving a mobile device and another computing device subject to software security features may be augmented with systems and methods discussed herein, without departing from the scope of the present teachings.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:
1. A method for facilitating configuring software security functionality, the method comprising:
    employing a first computing device to collect information associated with a user of enterprise software, resulting in collected information, and wherein the collected information includes location information pertaining to a location of the first computing device relative to a second computing device;

providing one or more rules that specify adjustments to one or more security features based on the collected information; and adjusting the one or more security features of the enterprise software to be accessed by the user via the second computing device based on the collected information, and wherein the adjusting of the one or more security features is based on the location of the first computing device relative to the second computing device.

2. The method of claim 1, further including:

employing a mobile device to collect the information, wherein the collected information includes collected contextual information;

using the contextual information with reference to the one or more rules, wherein the one or more rules further map contextual information to security software behaviors and determine one or more adjustments to be made to the security software behaviors in response thereto; and adjusting one or more user access permissions to one or more security features of the enterprise software based on the one or more adjustments.

3. The method of claim 1, wherein the one or more rules specify how the collected information is used to adjust user permissions to access one or more of software, functionality, and data provided via the enterprise software.

4. The method of claim 1, further including providing an administrator user option to adjust the one or more rules.

5. The method of claim 1, wherein the one or more rules enable accessing calendar information to determine when a user is in a meeting, and restricting software access in response thereto.

6. The method of claim 1, wherein the one or more rules enable determining that a user is commuting, and restricting software access in response thereto.

7. The method of claim 1, wherein the one or more rules enable determining that a user is in an office that includes the second computing device, and enable software access in response thereto.

8. The method of claim 1, wherein the one or more rules enable determining that a user is within an office building but not accessing the second computing device, and partially limiting software access in response thereto.

9. The method of claim 1, wherein the first computing device includes a mobile device, and wherein the second computing device includes a desktop computer in communication with the mobile device.

10. The method of claim 1, wherein the first computing device includes a mobile device, and wherein the second computing device includes a desktop computer in communication with the mobile device, and wherein the collected information includes location information pertaining to a location of the mobile device relative to the desktop computer.

11. The method of claim 1, wherein the first computing device includes a mobile device, and wherein the second computing device includes a desktop computer in communication with the mobile device, and wherein the method further comprises:

employing the mobile device to collect the information, wherein the collected information includes collected contextual information;

using the contextual information with reference to the one or more rules, wherein the one or more rules further map contextual information to security software behaviors and determine one or more adjustments to be made to the security software behaviors in response thereto;

adjusting one or more user access permissions to the one or more security features of the enterprise software based on the one or more determined adjustments;

providing an administrator user option to adjust the one or more rules;

wherein the one or more rules further specify how the collected information is used to adjust user permissions to access one or more of software, functionality, and data provided via the enterprise software, wherein the one or more rules enable accessing calendar information to determine when a user is in a meeting, and restricting software access in response thereto, wherein the one or more rules further enable determining that a user is commuting, and restricting software access in response thereto;

wherein the one or more rules further enable determining that a user is in an office that includes the second computing device, and enable software access in response thereto, wherein the one or more rules enable determining that a user is within an office building but not accessing the second computing device, and partially limiting software access in response thereto, wherein the collected information includes location information pertaining to a location of the mobile device relative to the desktop computer;

wherein the collected information includes velocity information pertaining to a velocity of the mobile device, and wherein the method further comprises employing the velocity information to determine when the user is commuting, and restricting the user's access to one or more features of the enterprise software on the second computing device in response thereto, wherein the collected information further includes calendar information pertaining to the user of the first computing device, and wherein the calendar information includes information pertaining to an itinerary or schedule associated with the user, wherein the collected information further includes usage history information pertaining to how the user has previously used software included in an enterprise computing environment, wherein the collected information further includes information pertaining to a task that a user is actively working on, and wherein the collected information further includes timing information pertaining to how much time has passed since a user has interacted with the enterprise software whose access is subject to the one or more security features; and employing the calendar information to facilitate determining when a user is in a meeting and restricting access to the one or more features of the enterprise software in response thereto, wherein the collected information includes user location information as determined by location information provided to a server via a mobile device employed by the user, and wherein the method further comprises selectively adjusting the one or more security features to enable a user to access all software features for which the user has permission to access when the user location is within a predetermined range of the desktop computer.

12. The method of claim 1, wherein the collected information includes velocity information pertaining to a velocity of a mobile device, and wherein the method further comprises employing the velocity information to determine when a user is commuting, and restricting user's access to one or more features of the enterprise software on the second computing device in response thereto.

13. The method of claim 1, wherein the collected information includes calendar information pertaining to the user of the first computing device, and wherein the calendar information includes information pertaining to an itinerary or schedule associated with the user.

14. The method of claim 13, further including employing the calendar information to facilitate determining when a user is in a meeting and restricting access to one or more features of the enterprise software in response thereto.

15. The method of claim 1, wherein the collected information includes user location information as determined by location information provided to a server via a mobile device employed by the user, and further including selectively adjusting the security features to enable a user to access all software features for which the user has permission to access when the user location is within a predetermined range of the second computing device.

16. The method of claim 1, wherein the collected information includes usage history information pertaining to how the user has previously used software included in an enterprise computing environment.

17. The method of claim 1, wherein the collected information includes information pertaining to a task that a user is actively working on.

18. The method of claim 1, wherein the collected information includes timing information pertaining to how much time has passed since a user has interacted with the enterprise software whose access is subject to the one or more security features.

19. An apparatus comprising:
  a digital processor coupled to a display and to a processor-readable storage device, wherein the processor-readable storage device includes one or more instructions executable by the digital processor to perform operations comprising:
    employing a first computing device to collect information associated with a user of enterprise software, resulting in collected information, and wherein the collected information includes location information pertaining to a location of the first computing device relative to a second computing device;
    providing one or more rules that specify adjustments to one or more security features based on the collected information; and
    adjusting the one or more security features of the enterprise software to be accessed by the user via the second computing device based on the collected information, and wherein the adjusting of the one or more security features is based on the location of the first computing device relative to the second computing device.

20. A processor-readable storage device including instructions executable by a digital processor, the processor-readable storage device including one or more instructions for:
  employing a first computing device to collect information associated with a user of enterprise software, resulting in collected information, and wherein the collected information includes location information pertaining to a location of the first computing device relative to a second computing device;
  providing one or more rules that specify adjustments to one or more security features based on the collected information; and
  adjusting the one or more security features of the enterprise software to be accessed by the user via the second computer device based on the collected information, and wherein the adjusting of the one or more security features is based on the location of the first computing device relative to the second computing device.

* * * * *